US009544898B2

(12) United States Patent
Hu et al.

(10) Patent No.: US 9,544,898 B2
(45) Date of Patent: Jan. 10, 2017

(54) COORDINATING BASE STATION DOWNLINK TRANSMISSIONS IN UNLICENSED FREQUENCY BANDS

(71) Applicants: Teck Hu, Melbourne, FL (US); Shin Horng Wong, Chippenham (GB)

(72) Inventors: Teck Hu, Melbourne, FL (US); Shin Horng Wong, Chippenham (GB)

(73) Assignee: Alcatel Lucent, Boulogne-Billancourt (FR)

( * ) Notice: Subject to any disclaimer, the term of this patent is extended or adjusted under 35 U.S.C. 154(b) by 62 days.

(21) Appl. No.: 14/328,534

(22) Filed: Jul. 10, 2014

(65) Prior Publication Data

US 2016/0014779 A1   Jan. 14, 2016

(51) Int. Cl.
*H04W 36/08* (2009.01)
*H04W 72/04* (2009.01)
(Continued)

(52) U.S. Cl.
CPC ........ *H04W 72/0453* (2013.01); *H04L 5/0032* (2013.01); *H04W 16/14* (2013.01);
(Continued)

(58) Field of Classification Search
CPC .. H04W 28/044; H04W 28/046; H04W 16/00; H04W 16/10; H04W 16/06; H04W 16/14; H04W 16/225; H04W 84/10; H04W 84/12; H04W 72/00; H04W 72/04; H04W 72/042; H04W 72/0426; H04W 72/0433; H04W 72/044; H04W 72/0453; H04W 72/12; H04W 36/0083; H04W 36/08; H04W 36/14; H04W 36/24; H04W 36/30
(Continued)

(56) References Cited

U.S. PATENT DOCUMENTS 6,295,285 B1    9/2001  Whitehead
8,478,282 B2 *  7/2013  Gupta ................. H04W 72/082
                                                    370/342
(Continued)

FOREIGN PATENT DOCUMENTS

WO   WO 2014/035415 A1 *  3/2014

OTHER PUBLICATIONS

"3rd Generation Partnership Project; Technical Specification Group Radio Access Network; Evolved Universal Terrestrial Radio Access (E-UTRA); Requirements for Support of Radio Resource Management (Release 8)", 3GPP TS 36.133 V8.20.0, Section 8.1, Jan. 2012, 30 pages.
(Continued)

*Primary Examiner* — Mohamed Kamara
(74) *Attorney, Agent, or Firm* — Davidson Sheehan LLP

(57) ABSTRACT

Base stations can exchange information indicating that the base stations are transmitting (or going to transmit) downlink signals over one or more unlicensed frequency bands. For example, a first indication that a first base station is reserving a first subset of a plurality of unlicensed frequency bands for downlink transmission can be transmitted over one or more interfaces between the first base station and one or more second base stations. The one or more second base stations can then refrain from transmitting potentially interfering downlink transmissions over the first subset of the plurality of unlicensed frequency bands. Information identifying the first subset may be stored by the one or more second base stations.

20 Claims, 5 Drawing Sheets

(51) Int. Cl.
  *H04L 5/00*    (2006.01)
  *H04W 24/08*   (2009.01)
  *H04W 74/08*   (2009.01)
  *H04W 16/14*   (2009.01)
  *H04W 28/26*   (2009.01)
  *H04W 92/20*   (2009.01)

(52) U.S. Cl.
  CPC ........... *H04W 24/08* (2013.01); *H04W 28/26* (2013.01); *H04W 72/0426* (2013.01); *H04W 74/0816* (2013.01); *H04W 92/20* (2013.01)

(58) Field of Classification Search
  USPC ......... 370/30, 252, 280, 312, 329–330, 336, 370/338; 455/419, 404.1, 435.3, 436, 455/452.1
  See application file for complete search history.

(56) References Cited

U.S. PATENT DOCUMENTS

| | | |
|---|---|---|
| 2003/0104849 A1 | 6/2003 | Arimitsu |
| 2005/0089057 A1 | 4/2005 | Kang |
| 2006/0148482 A1* | 7/2006 | Mangold ............... H04W 16/14 455/450 |
| 2006/0187952 A1 | 8/2006 | Kappes et al. |
| 2009/0122736 A1 | 5/2009 | Damjanovic |
| 2010/0124254 A1* | 5/2010 | Wu ......................... H04L 5/003 375/131 |
| 2010/0167742 A1* | 7/2010 | Rajagopalan ......... H04W 92/20 455/436 |
| 2010/0177757 A1 | 7/2010 | Kim |
| 2010/0197317 A1 | 8/2010 | Sadek |
| 2011/0228666 A1 | 9/2011 | Barbieri |
| 2012/0015607 A1 | 1/2012 | Koskela |
| 2012/0077510 A1* | 3/2012 | Chen ..................... H04W 28/26 455/452.1 |
| 2012/0129522 A1* | 5/2012 | Kim .................. H04W 72/0426 455/434 |
| 2012/0207036 A1 | 8/2012 | Ong |
| 2013/0058218 A1 | 3/2013 | Wu |
| 2013/0136097 A1 | 5/2013 | Yu et al. |
| 2013/0344883 A1* | 12/2013 | Rinne ............... H04W 72/0453 455/452.1 |
| 2014/0342745 A1 | 11/2014 | Bhushan |
| 2015/0009871 A1* | 1/2015 | Shousterman ........ H04W 16/06 370/280 |
| 2015/0156636 A1 | 6/2015 | Tabet |

OTHER PUBLICATIONS

Final Office Action mailed Apr. 27, 2016 for U.S. Appl. No. 14/328,517, 24 pages.

U.S. Appl. No. 14/328,517, filed Jul. 10, 2014, listing Shin-Horng Wong, et al. as inventor(s), entitled "Licensed Band Feedback for Unlicensed Band Communication".

Final Office Action mailed Sep. 15, 2016 for U.S. Appl. No. 14/328,517, 31 pages.

* cited by examiner

COORDINATING BASE STATION DOWNLINK TRANSMISSIONS IN UNLICENSED FREQUENCY BANDS

CROSS REFERENCE TO RELATED APPLICATIONS

This application is related to U.S. patent application Ser. No. 14/328,517, filed on Jul. 10, 2014.

BACKGROUND

Field of the Disclosure

The present disclosure relates generally to wireless communication and, more particularly, to downlink transmissions in unlicensed frequency bands of a wireless communication system.

Description of the Related Art

Unlicensed frequency bands are portions of the radiofrequency spectrum that do not require a license for use and may therefore be used by any device to transmit or receive radiofrequency signals. For example, the industrial, scientific, and medical (ISM) radio bands are portions of the radio spectrum that are reserved internationally for unlicensed communication. The ISM radio bands include bands with a center frequency of 2.4 GHz and a bandwidth of 100 MHz, a center frequency of 5.8 GHz and a bandwidth of 150 MHz, and a center frequency of 24.125 GHz and a bandwidth of 250 MHz, among other frequency bands. Unlicensed frequency bands can be contrasted to licensed frequency bands that are licensed to a particular service provider and may only be used for wireless communication that is authorized by the service provider. Wireless communication devices that transmit or receive signals in unlicensed frequency bands are typically referred to as nodes. For example, the base stations or access points that provide wireless connectivity to a network and the user equipment or other devices that access the network over an air interface to the base stations or access points may be referred to as nodes in the wireless communication system.

Wireless communication systems that utilize unlicensed frequency bands, such as Wi-Fi systems, are prone to a "hidden node problem." For example, if two user equipment are within range of the same access point, but are too far apart to be aware of each other, the two user equipment are "hidden" from each other. Access points or base stations can also be hidden from each other by distance or intervening obstructions. Nodes that are hidden from each other cannot coordinate transmission and reception of packets, e.g., to force time-sharing between the two nodes. Packets transmitted by nodes that are hidden from each other may therefore collide at a receiving node, which can only decode one packet at a time. Consequently, packets intended for the receiving node may be missed or lost if they collide with other packets transmitted by a hidden node. The hidden node problem can be exacerbated by the presence of obstructions between the stations for the access points. For example, building penetration losses are typically on the order of 11-20 dB. Consequently, an indoor access point may be hidden from an outdoor base station even though they may be physically proximate to each other. Similarly, two user equipment in the same building may be hidden from each other if they are separated by one or more walls, doors, or other obstructions within the building.

A carrier sense multiple access (CSMA) protocol may be used to detect or avoid collisions that may be caused by the hidden node problem. In CSMA, a transmitting node monitors a channel in the unlicensed band to determine whether it is currently being used for other transmissions and only transmits if the channel is unoccupied. The CSMA protocol may be enhanced using a request-to-send/clear-to-send (RTS/CTS) protocol. The RTS/CTS protocol attempts to reduce collisions by allowing a transmitting node to send an RTS frame that indicates that the transmitting node would like to transmit information to a receiving node if the transmitting node detects a clear unlicensed channel. If the receiving node also determines that the unlicensed channel is clear, the receiving node replies with a CTS frame that indicates that the transmitting node is free to transmit information on the unlicensed channel for a time interval. Other nodes that detect the CTS frame are to refrain from transmitting on the unlicensed channel during the time interval indicated in the CTS frame. However, carrier sensing protocols may not effectively prevent collisions of downlink transmissions if some or all neighboring access points or base stations do not "hear" the RTS or CTS frames transmitted by the user equipment.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

A base station can prevent, or at least reduce the probability of, collisions between its downlink transmissions in one or more unlicensed frequency bands and downlink transmissions from other base stations in the unlicensed frequency bands by transmitting signals over an interface between the base station and a neighbor base station to indicate that the base station is using or intends to use the one or more unlicensed frequency bands for downlink transmissions. The neighbor base station may then refrain from transmitting downlink signals over the unlicensed frequency band (or bands) indicated in the signals from the base station until the neighbor base station receives an indication that the base station has released the unlicensed frequency band (or bands) or until a duration of the reservation has elapsed. Some embodiments of base stations may store information indicating subsets of a plurality of unlicensed frequency bands that are clear for downlink transmissions and subsets of the plurality of unlicensed frequency bands that have been reserved by other base stations for downlink transmissions. The base stations may use the stored information to select subsets of the unlicensed frequency bands for downlink transmissions or to limit the subsets that are monitored by user equipment, e.g., during measurement gaps. For example, user equipment may be instructed to monitor the clear subsets and to bypass monitoring of subsets that have been reserved by other base stations for downlink transmissions, thereby reducing the power consumed by the user equipment for monitoring the unlicensed frequency bands.

Figure 1:
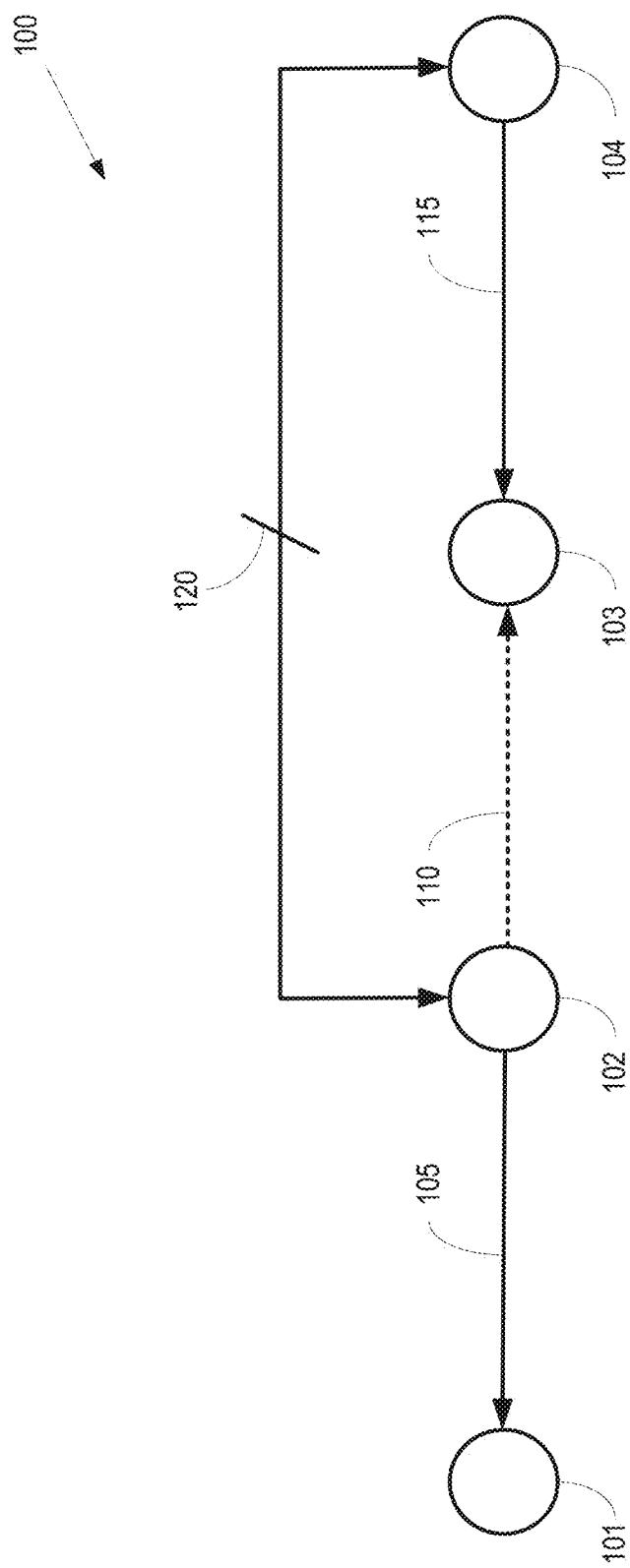
FIG. 1 is a diagram of a first example of a wireless communication system according to some embodiments.

FIG. 1 is a diagram of a first example of a wireless communication system 100 according to some embodiments. The wireless communication system 100 includes a plurality of wireless communication nodes 101, 102, 103, 104 (collectively referred to herein as "the nodes 101-104"). Embodiments of the nodes 101-104 may be wireless transceivers such as access points or stations. For example, the nodes 101, 103 may be stations such as mobile units, mobile terminals, user equipment, access terminals, and the like. The nodes 102, 104 may be wireless access points for providing wireless connectivity to the nodes 101, 103. The nodes 102, 104 may be also be referred to as base stations or eNodeBs. The nodes 102, 104 may transmit signals over a downlink (or forward link) to the nodes 101, 103. The nodes 101, 103 may transmit signals over an uplink (or reverse link) to the nodes 102, 104.

The nodes 101-104 may be configured to communicate over an air interface in licensed frequency bands or unlicensed frequency bands. As used herein, the phrase "unlicensed frequency band" will be understood to refer to a portion of the radiofrequency spectrum that does not require a license for use and may therefore be used by any of the nodes 101-104 to transmit or receive radiofrequency signals. For example, unlicensed frequency bands may include, but are not limited to, the industrial, scientific, and medical (ISM) radio bands that are reserved internationally for unlicensed communication. Unlicensed frequency bands may be defined by a center frequency and a bandwidth. For example, the ISM radio bands include bands with a center frequency of 2.4 GHz and a bandwidth of 100 MHz, a center frequency of 5.8 GHz and a bandwidth of 150 MHz, and a center frequency of 24.125 GHz and a bandwidth of 250 MHz, among other frequency bands. As used herein, the phrase "licensed frequency band" will be understood to refer to a portion of the radiofrequency spectrum that is licensed to a particular service provider or providers and may only be used for wireless communication by the nodes 101-104 that are authorized by the service provider. For example, the United States Federal Communication Commission (FCC) licenses the frequency bands 698-704 MHz and 728-734 MHz to Verizon Wireless and the frequency bands 710-716 MHz and 740-746 MHz to AT&T, although both may be referred to as "700 MHz service."

Embodiments of the nodes 101-104 may communicate over subsets of unlicensed frequency bands. For example, an unlicensed frequency band with a center frequency of 5 GHz and a bandwidth of 400 MHz may be subdivided into a set of 20 unlicensed frequency bands that each have a bandwidth of 20 MHz. Nodes 102, 104 may therefore use one or more since the 20 MHz unlicensed frequency bands for downlink transmissions to the nodes 101, 103. Some embodiments of the nodes 102, 104 may aggregate one or more of the unlicensed frequency bands with one or more licensed frequency bands so that data can be transmitted to the nodes 101, 103 concurrently in the unlicensed frequency bands and the licensed frequency bands.

Nodes 102, 104 may be operated by different service providers or may operate according to different protocols (e.g., Long Term Evolution (LTE) standards or IEEE 802.11 standards) and consequently the nodes 102, 104 may not be able to coordinate downlink transmissions in the unlicensed frequency bands. Moreover, the nodes 102, 104 may be hidden from each other due to their separation or due to obstructions (not shown in FIG. 1) that are interposed between the nodes 102, 104. In the illustrated embodiment, the node 102 is associated with the node 101 and is attempting to communicate with the node 101 by transmitting packets over a downlink channel of the unlicensed frequency band, as indicated by the arrow 105. Signals transmitted by the node 102 over the downlink channel in the unlicensed frequency band may also be received by the node 103, as indicated by the dotted line 110. The node 104 may also be attempting to transmit packets over the downlink channel of the unlicensed frequency band to the node 103, as indicated by the arrow 115. The node 104 may also be able to communicate with the node 103 over uplink or downlink channels of the licensed frequency band, e.g., according to LTE standards.

An interface 120 may be established between the nodes 102, 104. Some embodiments of the interface 120 are peer-to-peer interfaces in which the nodes 102, 104 are endpoints of the interface 120. For example, the node 102 may identify the node 104 as a neighboring node that may generate downlink transmissions that may interfere or collide with downlink transmissions from the node 102 over one or more unlicensed frequency bands. The nodes 102, 104 may therefore establish the interface 120 so that the nodes 102, 104 can communicate directly with each other by exchanging messages over the interface 120. The interface 120 may therefore be implemented by encapsulating or tunneling messages over an intervening network, e.g. by appending a header to the message that identifies the destination node. A peer-to-peer interface can be contrasted to the air interface used to carry conventional RTS/CTS messages in unlicensed frequency bands. The conventional RTS/CTS messages can be heard by any node that is monitoring the unlicensed frequency bands, whereas messages transmitted over the interface 120 are only heard by the nodes 102, 104. Each node 102, 104 may establish multiple interfaces with other nodes. For example, the node 102 may establish peer-to-peer interfaces with each neighboring node that can transmit over the unlicensed frequency bands.

The interface 120 may be used to coordinate downlink transmissions in the unlicensed frequency bands. For example, in order to prevent, or at least reduce the probability of, collisions between packets transmitted over the unlicensed frequency bands by the nodes 102, 104, the node 104 may transmit signals over the interface 120 to reserve one or more of the unlicensed frequency bands for downlink transmissions. As used herein, the term "reserve" will be understood to mean that a transmitting node is notifying the receiving node that the transmitting node is (or is going to be) transmitting on the reserved unlicensed frequency bands and the receiving node should refrain from downlink transmissions on the unlicensed frequency bands. However, the term "reserve" does not necessarily imply that the receiving node is required to take any particular action in response to receiving the reservation.

The node 102 may refrain from downlink transmissions in the reserved unlicensed frequency bands for a time interval indicated by the node 104. For example, the node 102 may refrain from downlink transmissions in response to receiving the reservation from the node 104 until the node 104 provides a signal releasing the one or more unlicensed frequency bands. For another example, the reservation transmitted by the node 104 over the interface 120 may include information indicating a starting time or an ending time for the reservation of the one or more unlicensed frequency bands. The node 102 may use the reservation information to select other unlicensed frequency bands (which do not overlap the reserved unlicensed frequency bands) for downlink transmissions, e.g., to the node 101.

The node 104 may also provide information to instruct the node 103 to monitor the one or more reserved unlicensed frequency bands for downlink transmission. The information may be provided over licensed frequency bands. Some embodiments of the node 103 may monitor the reserved unlicensed frequency bands to determine whether the reserved unlicensed frequency bands are clear for downlink transmission. As used herein, the term "clear" will be understood to indicate that a measured value of a parameter of signals in the unlicensed frequency band (such as a signal-to-noise ratio, received signal strength indicator, and the like) is below a threshold value indicating that the unlicensed frequency band is clear of transmissions by other nodes and packets transmitted over a channel of the unlicensed frequency band are unlikely to collide with packets transmitted by other nodes. Some embodiments of the node 103 may perform measurements during measurement gaps in communication over another licensed or unlicensed frequency band. For example, the node 103 may tune a transceiver from a first frequency band to a second frequency band (thereby creating a measurement gap at the first frequency band) to perform measurements in the second frequency band.

Figure 2:
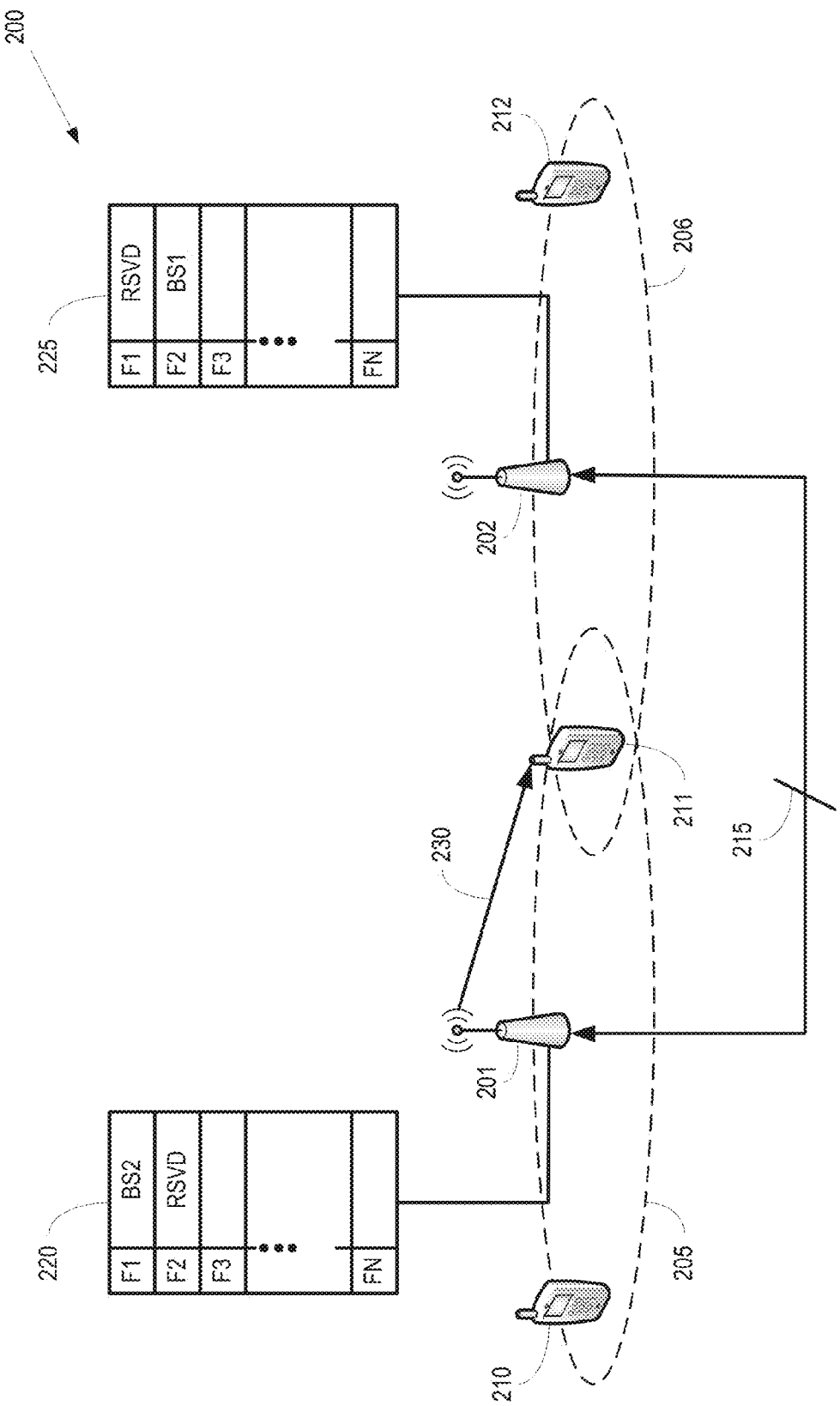
FIG. 2 is a diagram of a second example of a wireless communication system according to some embodiments.

FIG. 2 is a diagram of a second example of a wireless communication system 200 according to some embodiments. The wireless communication system 200 includes base stations 201, 202 that provide wireless connectivity to a corresponding geographic areas or cells 205, 206. As used herein, the term "base station" refers to any device that can provide wireless connectivity and includes, but is not limited to, eNodeBs, base station routers, access points, macrocells, microcells, metrocells, femtocells, picocells, and the like. Some embodiments of the base stations 201, 202 may correspond to the nodes 102, 104 shown in FIG. 1.

The base stations 201, 202 may provide wireless connectivity to user equipment 210, 211, 212 (collectively referred to as "the user equipment 210-212"). Some embodiments of the base stations 201, 202 and the user equipment 210-212 communicate over uplink and downlink channels of one or more licensed frequency bands. The base stations 201, 202 may also transmit downlink signals to the user equipment 210-212 over one or more unlicensed frequency bands. For example, the base stations 201, 202 may transmit downlink signals to the user equipment 210-212 over a set of unlicensed frequency bands F1-FN that may include twenty 20 MHz unlicensed frequency bands in a 400 MHz bandwidth. The base stations 201, 202 may therefore aggregate one or more downlink channels of the licensed frequency bands with one or more downlink channels in a subset of the unlicensed frequency bands to increase the overall bandwidth for downlink transmissions to the user equipment 210-212.

The base stations 201, 202 communicate over an interface 215 to reserve subsets of the unlicensed frequency bands for downlink transmission. For example, the base stations 201, 202 may reserve the subset by transmitting control plane or user plane signaling over an interface 215 such as an X2 interface defined by the LTE standards. For example, the base station 202 may have reserved a subset of the unlicensed frequency bands including the unlicensed frequency band F1 for current or future downlink transmissions. The base station 202 may therefore have transmitted a reservation over the interface 215 to the base station 201, which may store information indicating the reservation. For example, the base station 201 may include a data structure 220 that stores information indicating the status of the unlicensed frequency bands. The data structure 220 stores information indicating that the unlicensed frequency band F1 has been reserved by the base station 202, as indicated by the label BS2 in the data structure 220. The base station 202 also includes a data structure 225 that stores information indicating the status of the unlicensed frequency bands. For example, the data structure 225 stores information indicating that it has reserved (RSVD) the unlicensed frequency band F1.

The base station 201 may use the information in the data structure 220 to select a subset of the unlicensed frequency bands for downlink transmission, e.g., to the user equipment 211. For example, the base station 201 may determine that the base station 202 has reserved the frequency F1 and so the base station 201 may select the frequency F2 for downlink transmission to the user equipment 211. The base station 201 may then transmit a reservation over the interface 215 to the base station 202, which may store information indicating the reservation. For example, the data structure 220 may store information indicating that the unlicensed frequency band F2 has been reserved by the base station 201, as indicated by the label BS1 in the data structure 220. The base station 202 may therefore refrain from downlink transmissions in the unlicensed frequency band F2.

In some embodiments, the signaling may be "pushed" over the interface 215 from one base station to another so that the receiving base station is not required to request the information or respond to the pushed signaling. Pushing the reservations over the interface 215 may therefore reduce signaling overhead on the interface 215 and reduce the likelihood that the interface 215 becomes overloaded. Signaling received over the interface 215 may be used to identify neighbors. For example, the base station 201 may identify the base station 202 as a neighbor in response to receiving the reservation of the unlicensed frequency band F1 over the interface 215. The base station 201 may therefore include the base station 202 in a list of neighbors that receive subsequent reservations of unlicensed frequency bands.

Pushing information over the interface 215 may be triggered by an event at the base stations 201, 202. For example, the base station 201 may push information over the interface 215 to the base station 202 in response to the base station 201 deciding to use the unlicensed frequency band F2 for downlink transmissions to the user equipment 211. For another example, the base station 201 may push information over the interface 215 to the base station 202 in response to the base station 201 deciding to reserve the unlicensed frequency band F2 for downlink transmission to the user equipment 211 in a subsequent time interval. The base stations may also push information over the interface 215 to release reservations of subsets of the unlicensed frequency bands. For example, the base station 201 may push information over the interface 215 to the base station 202 to release the reservation of the unlicensed frequency band F2 in response to the base station 201 discontinuing use of the unlicensed frequency band F2 for downlink transmission to the user equipment 211.

The base station 201 may provide signaling 230 to instruct the user equipment 211 to monitor the unlicensed frequency band F2 to verify whether any other interference exists in the unlicensed frequency band F2. As discussed herein, the user equipment 211 may monitor the unlicensed frequency band F2, or other unlicensed frequency bands, during measurement gaps. The base stations 201, 202 may also provide cell acquisition information to the other user equipment 210, 212 so that the user equipment 210, 212 can perform cell detection of neighboring base stations in the reserved unlicensed frequency band F2 or other unlicensed frequency bands. Cell acquisition information may include a bandplan identifier that instructs user equipment 210, 212 to tune to a specific frequency or a cell identifier that may be obtained by decoding the primary synchronization signal (PSS) and a secondary synchronization signal (SSS). The user equipment 210, 212 may perform cell detection through measurement gaps to try and acquire cell information from one or more neighboring base stations using the identified frequencies or cells. The user equipment 210, 212 may then feedback information gathered during the cell detection process to the corresponding serving base stations 201, 202. For example, the user equipment 210, 212 may feedback information identifying other neighboring base stations transmitting in the unlicensed frequency band F2. Some embodiments of the base stations 201, 202 may identify base stations as neighbors using information provided by the user equipment 210-212.

Figure 3:
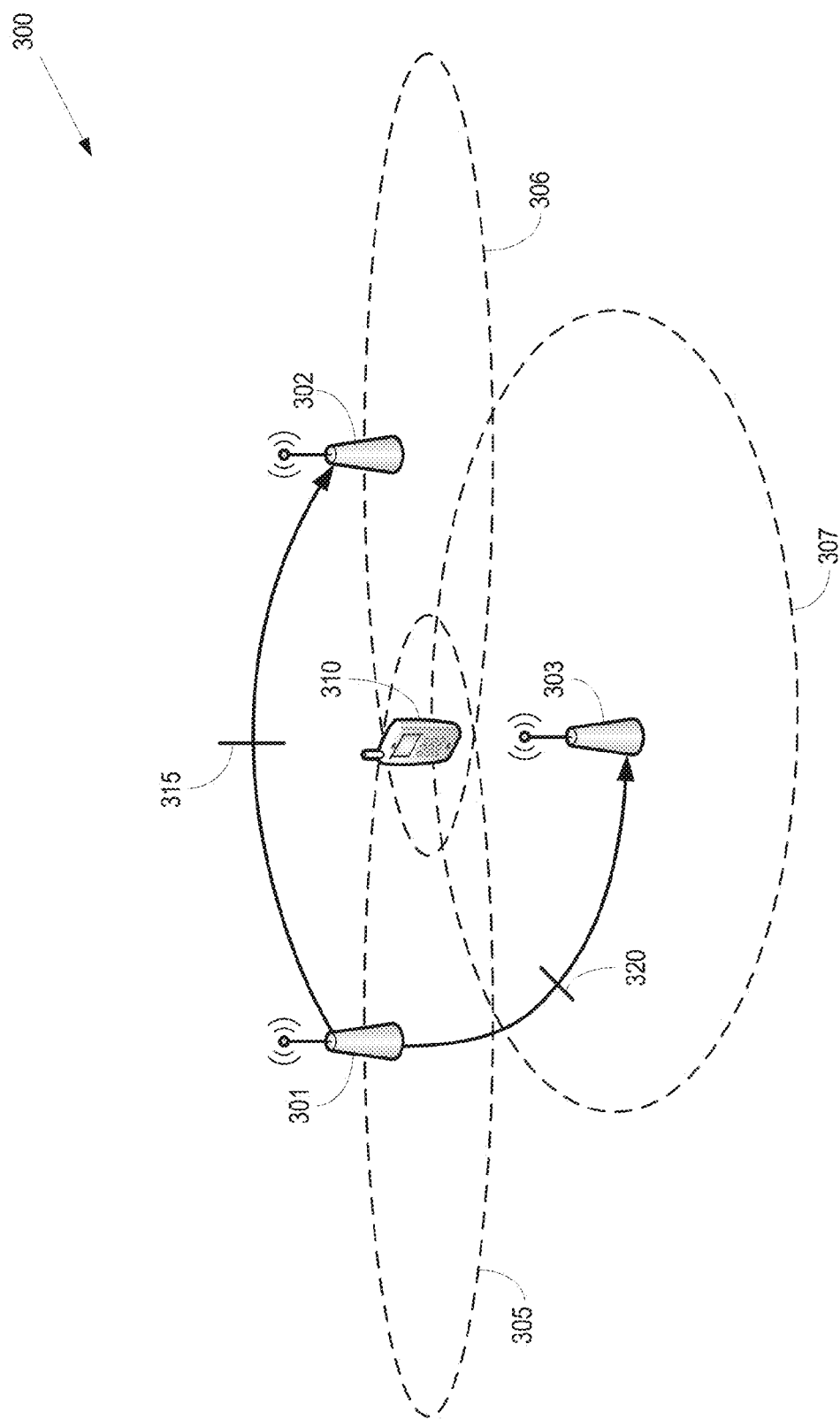
FIG. 3 is a diagram of a third example of a wireless communication system according to some embodiments.

FIG. 3 is a diagram of a third example of a wireless communication system 300 according to some embodiments. The wireless communication system 300 includes base stations 301, 302, 303 (collectively referred to herein as "the base station 301-303") that provide wireless connectivity to corresponding geographic areas or cells 305, 306, 307 (collectively referred to herein as "the cells 305-307"). The base stations 301-303 may provide wireless connectivity to user equipment 310 (only one shown in FIG. 3 in the interest of clarity). Some embodiments of the base stations 301-303 and the user equipment 310 communicate over uplink and downlink channels of one or more licensed frequency bands. The base stations 301-303 may also transmit downlink signals to the user equipment 310 over one or more unlicensed frequency bands. The set of unlicensed frequency bands includes at least the subsets F1 and F2.

The base station 302 has reserved the subset F1 of the unlicensed frequency bands for downlink transmission. The base station 302 has therefore notified the base station 301 of the reservation so that the base station 301 refrains from downlink transmission over the subset F1, as discussed herein. The base station 301 receives information for transmission to the user equipment 110 and selects the subset F2 of the unlicensed frequency band for downlink transmission of the information to the user equipment 110. The base station 301 transmits a reservation for the subset F2 to the base station 302 over the interface 315 and transmits a reservation for the subset F2 to the base station 303 over the interface 320. The base stations 302, 303 may therefore refrain from downlink transmission over the subset F2.

In effect, the reservations transmitted by the base station 301 to each of the base station 302, 303 function as "request-to-send" messages, although the reservations differ from a conventional RTS message because the reservation is only "heard" by the base station connected to the corresponding interface 315, 320. For example, the base station 302 does not hear reservations transmitted over the interface 320 and the base station 303 does not hear reservations transmitted over the interface 315. Embodiments of the base station 301-303 may optionally respond to reservations transmitted over the interfaces 315, 320 to confirm receipt of the reservation. The response messages may therefore function as "clear-to-send" messages.

Figure 4:
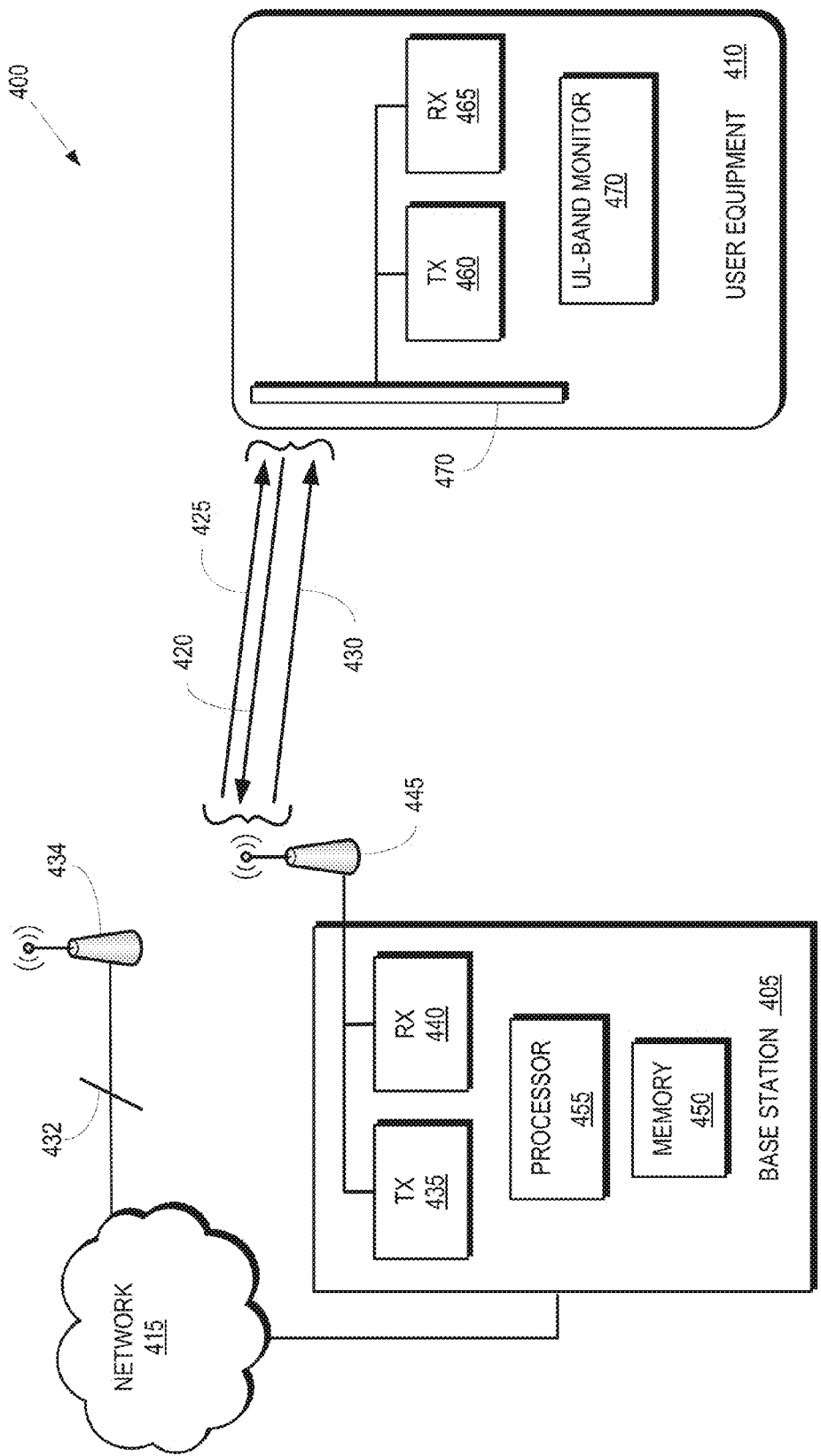
FIG. 4 is a diagram of a fifth example of a wireless communication system according to some embodiments.

FIG. 4 is a diagram of a fourth example of a wireless communication system 400 according to some embodiments. The wireless communication system 400 includes a base station 405 that supports wireless connectivity to user equipment 410. User equipment 410 may access a network 415 by exchanging signals over an air interface with the base station 405. Some embodiments of the base station 405 or the user equipment 410 may correspond to one or more of the nodes 101-104 shown in FIG. 1. The base station 405 and the user equipment 410 may communicate over one or more uplink channels 420 and one or more downlink channels 425 in a licensed frequency band. The base station 405 and the user equipment 410 may also communicate over a supplementary downlink channel 430 in an unlicensed frequency band. An interface 432 may be established between the base station 405 and one or more other base stations 434, as discussed herein. Some embodiments of the interface 432 may be supported by the network 415.

Some embodiments of the base station 405 include a transmitter (TX) 435 and a receiver (RX) 440 that are coupled to an antenna 445. The transmitter 435 may therefore transmit signals over the downlink channels 425 in the licensed frequency band or the supplementary downlink channel 430 in the unlicensed band. The receiver 440 may receive signals over the uplink channels 420. The base station 405 includes memory 450 for storing information such as processor instructions, data for transmission, received data, and the like. A processor 455 may be used to process information for transmission, process received information, or perform other operations as discussed herein, e.g., by executing instructions stored in the memory 450. The processor 455 may also be used to generate reservations for transmission over the interface 432 to one or more other base stations 434, as discussed herein. The base station 405 may also receive reservations from the other base stations 434 over the interface 432, as discussed herein.

Some embodiments of the processor 455 may be used to generate configuration information that is used to configure the user equipment 410 to monitor the downlink channel 430 of the unlicensed frequency bands. For example, the user equipment 410 may be configured to monitor subsets of unlicensed frequency bands that have been reserved by the base station 405 for downlink communication. Some embodiments of the user equipment 410 may be configured to provide signals indicating whether the downlink channel 430 is clear for wireless communication. Configuration information may include information identifying one or more subsets of unlicensed frequency bands such as one or more 20 MHz blocks of a 400 MHz unlicensed frequency band.

The processor 455 may be able to choose from among available subsets of the unlicensed frequency bands. For example, the memory 450 may be used to store a data structure such as the data structures 220, 225 shown in FIG. 2. The memory 450 may therefore store information indicating whether one or more subsets of the unlicensed frequency bands have been reserved by the base station 405 for downlink transmissions, reserved by other base stations 434 for downlink transmissions, or are available to be reserved for current for subsequent downlink transmissions. The processor 455 may therefore choose one or more subsets of the unlicensed frequency bands that have not been reserved for downlink transmissions by other base stations 434. Some embodiments of the memory 450 may also be used to store information indicating a starting time for downlink transmissions in a reserved unlicensed frequency band, an ending time for the downlink transmissions, a duration of the downlink transmissions, and the like.

Some embodiments of the user equipment 410 include a transmitter (TX) 460 and a receiver (RX) 465 that are coupled to an antenna 470. The transmitter 460 may transmit signals over the uplink channel 420 in the licensed frequency band. The receiver 465 may receive signals over the downlink channel 425 in the licensed frequency band and the supplementary downlink channel 430 in the unlicensed frequency band. The user equipment 410 includes an unlicensed (UL) band monitor 475 that can be used to monitor one or more subsets of the unlicensed frequency bands such as the subsets that have been reserved for transmissions over the supplementary downlink channel 430. For example, the unlicensed band monitor 475 may measure signals on the supplementary downlink channel 430 to determine whether the supplementary downlink channel 430 is clear or not. The unlicensed band monitor 475 may also be used to monitor other subsets of the unlicensed frequency bands indicated by the base station 405. Techniques for determining whether the unlicensed frequency bands are clear for transmission by measuring or sensing the unlicensed frequency bands are known in the art. For example, the receiver 465 and the unlicensed band monitor 470 may be used to measure a signal strength on the supplementary downlink channel 430 during measurement gaps in which the transmitter 460 does not transmit in at least a portion of the unlicensed frequency band.

Figure 5:
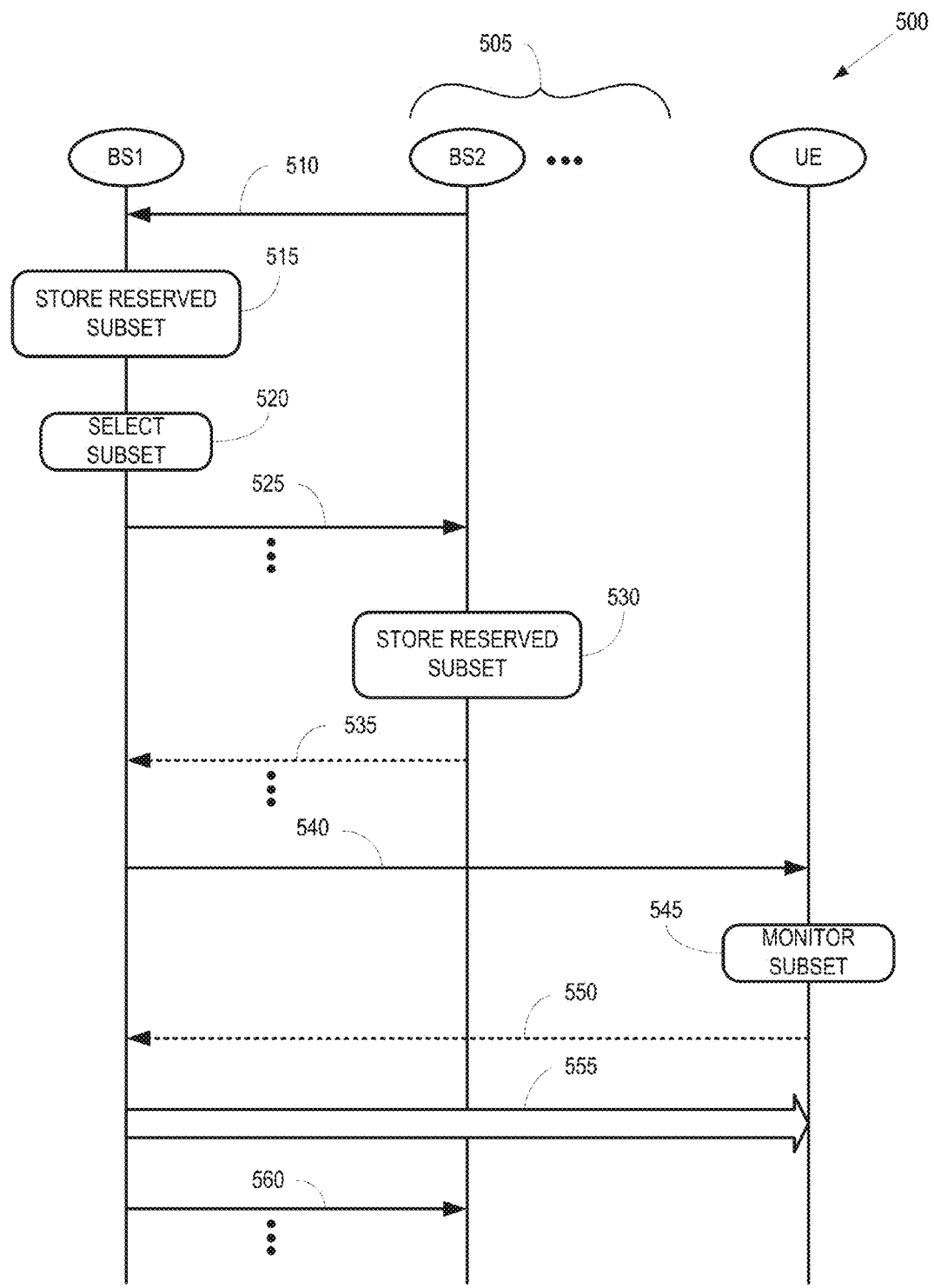
FIG. 5 is a signaling diagram that illustrates an example of a signal flow for reserving one or more unlicensed frequency bands using an interface between base stations according to some embodiments.

FIG. 5 is a signaling diagram that illustrates an example of a signal flow 500 for reserving one or more unlicensed frequency bands using an interface between base stations according to some embodiments. The signals in the signal flow 500 are transmitted over one or more interfaces between a first base station (BS1) and a set 505 of one or more second base stations (BS2), which may correspond to the nodes 102, 104 shown in FIG. 1. At signal 510, the set 505 of second base stations provides one or more reservations to the first base station indicating that one or more subsets of unlicensed frequency bands have been reserved for downlink transmission. The reservations are provided over one or more interfaces between the first base station and the one or more second base stations, as discussed herein. At block 515, the first base station stores information indicating the reserved frequencies, e.g., in a data structure such as the data structures 220, 225 shown in FIG. 2.

The first base station may receive information for transmission over a downlink to user equipment (UE). At block 520, the first base station may therefore select one or more subsets of unlicensed frequency bands for downlink transmission. The subsets of unlicensed frequency bands may be used to transmit the information concurrently with transmission of additional information over a licensed frequency band. The subsets that are selected at block 520 are chosen to be different than the stored subsets that were previously reserved by the set 505 of second base stations. At signals 525, the first base station reserves the selected subset by transmitting reservations over the interfaces to the one or more second base stations, which may then refrain from downlink transmissions on the reserved subset of the unlicensed frequency bands, as discussed herein. For example, the one or more second base stations may store information indicating the reserved subset at block 530. Some embodiments of the one or more second base stations may optionally provide a response indicating receipt of the reservation at signal 535.

At signal 540, the first base station provides information to configure the user equipment to monitor (at block 545) the reserved subset of the unlicensed frequency bands. Some embodiments of the user equipment may sense the reserved subset to determine whether any other base stations are transmitting on the reserved subset. The user equipment may therefore optionally provide a response at signal 550 indicating whether the reserved subset is clear for downlink transmission. At signal 550, the first base station transmits downlink information to the user equipment over the reserved subset of unlicensed frequency bands. Transmission of the information over the downlink may continue for a duration indicated by the reservation or until the first base station signals release of the reserved subset of unlicensed frequency band to the one or more second base stations at signal 560.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
transmitting, over at least one peer-to-peer interface between a first base station and at least one second base station, a first indication that the first base station is reserving a first subset of a plurality of unlicensed frequency bands for downlink transmission, wherein the first base station is a first endpoint of each of the at least one peer-to-peer interfaces and each of the at least one second base stations is a second endpoint of a corresponding one of the at least one peer-to-peer interfaces; and
transmitting cell acquisition information to instruct user equipment to bypass performing measurements of signal strengths on the first subset and to perform measurements of signal strengths on a second subset of the plurality of unlicensed frequency bands.

2. The method of claim 1, further comprising:
receiving, over the at least one peer-to-peer interface between the first base station and the at least one second base station, at least one second indication that the at least one second base station is reserving a second subset of the plurality of unlicensed frequency bands for downlink transmissions; and
storing information identifying the second subset.

3. The method of claim 2, wherein transmitting the cell acquisition information comprises transmitting cell acquisition information to instruct the user equipment to perform measurements to detect at least one of a clear-to-send (CTS) message and a request-to-send (RTS) message on the second subset.

4. The method of claim 2, further comprising:
selecting the first subset of the plurality of unlicensed frequency bands for downlink transmission based on the stored information identifying the second subset of the plurality of unlicensed frequency band.

5. The method of claim 1, wherein transmitting the first indication comprises transmitting a first indication that comprises an indication of a duration of a reservation of the first subset of the plurality of unlicensed frequency bands.

6. The method of claim 1, further comprising:
transmitting, over the at least one peer-to-peer interface, a third indication that the first base station is releasing the first subset of the plurality of unlicensed frequency bands.

7. The method of claim 1, further comprising:
transmitting data to the user equipment over the first subset of the plurality of unlicensed frequency bands.

8. The method of claim 7, wherein transmitting data to the user equipment comprises transmitting data to the user equipment over the first subset of the plurality of unlicensed frequency bands concurrently with transmitting data to the user equipment over at least one licensed frequency band.

9. A method comprising:
receiving, over at least one peer-to-peer interface between at least one first base station and a second base station, at least one first indication that the at least one first base station is reserving a first subset of a plurality of unlicensed frequency bands for downlink transmissions, wherein each of the at least one first base stations is a first endpoint of a corresponding one of the at least one peer-to-peer interfaces and the second base station is a second endpoint of each of the at least one peer-to-peer interfaces;
storing information identifying the first subset at the second base station; and
transmitting cell acquisition information to instruct first user equipment to perform measurements of signal strengths on the first subset and to bypass performing measurements of signal strengths on a second subset of the plurality of unlicensed frequency bands.

10. The method of claim 9, further comprising:
selecting a second subset of the plurality of unlicensed bands for downlink transmission based on the stored information identifying the first subset.

11. The method of claim 10, further comprising:
transmitting, over the at least one peer-to-peer interface, at least one second indication that the second base station is reserving the second subset of the plurality of unlicensed frequency bands for downlink transmission.

12. The method of claim 11, further comprising:
transmitting data to second user equipment over the second subset of the plurality of unlicensed frequency bands concurrently with transmitting data to the second user equipment over at least one licensed frequency band.

13. An apparatus comprising:
a first base station to transmit, over at least one peer-to-peer interface between the first base station and at least one second base station, a first indication that the first base station is reserving a first subset of a plurality of unlicensed frequency bands for downlink transmission, wherein the first base station is a first endpoint of each of the at least one peer-to-peer interfaces and each of the at least one second base stations is a second endpoint of a corresponding one of the at least one peer-to-peer interfaces, and wherein cell acquisition information is transmitted to instruct user equipment to bypass performing measurements of signal strengths on the first subset and to perform measurements of signal strengths on a second subset of the plurality of unlicensed frequency bands.

14. The apparatus of claim 13, wherein the first base station is to receive, over the at least one peer-to-peer interface, at least one second indication that the at least one second base station is reserving a second subset of the plurality of unlicensed frequency bands for downlink transmissions, and wherein the first base station is to store information identifying the second subset.

15. The apparatus of claim 14, wherein the first base station is to transmit cell acquisition information for the user equipment to perform measurements to detect at least one of a clear-to-send (CTS) message and a request-to-send (RTS) on the second subset.

16. The apparatus of claim 14, wherein the first base station is to select the first subset for downlink transmission based on the stored information identifying the second subset.

17. The apparatus of claim 13, wherein the first base station to transmit a first indication that comprises an indication of a duration of a reservation of the first subset of the plurality of unlicensed frequency bands.

18. The apparatus of claim 13, wherein the first base station is to transmit, over the at least one peer-to-peer interface, a third indication that the first base station is releasing the first subset of the plurality of unlicensed frequency bands.

19. The apparatus of claim 13, wherein the base station is to transmit data to user equipment over the first subset of the plurality of unlicensed frequency bands.

20. The apparatus of claim 19, wherein the base station is to transmit data to the user equipment over the first subset of the plurality of unlicensed frequency bands concurrently with transmitting data to the user equipment over at least one licensed frequency bands.

* * * * *